UNITED STATES PATENT OFFICE.

LOUIS J. HRISSIKOS, OF MOLINE, ILLINOIS.

MEDICINAL COMPOUND.

1,395,228. Specification of Letters Patent. Patented Oct. 25, 1921.

No Drawing. Application filed July 17, 1920. Serial No. 397,053.

*To all whom it may concern:*

Be it known that I, LOUIS J. HRISSIKOS, a subject of the King of Greece, residing at Moline, in the county of Rock Island and State of Illinois, have invented certain new and useful Improvements in a Medicinal Compound, of which the following is a specification.

My invention relates to medicinal compounds, and has reference more specially to a mixture which is designed as a cure for diseases of the eyes, and particularly for the relief of the disease commonly known as "trachoma."

The compound comprises a mixture of the following ingredients, in substantially the proportions named, to wit: two grains of pilocarpin hydrochlorid, two ounces of distilled water, and five drops of the juice of the "skinto" tree, found in Greece, the Latin name of which is *uva ursi*.

The water and pilocarpin are first mixed together, and then the skinto juice dropped into the mixture. The resulting ointment is applied to the diseased parts with a brush or soft cloth.

Prior to the application of the above compound the afflicted parts are cleansed by the use of a solution of two grains of argyrol in two ounces of distilled water.

The juice of the skinto tree is produced by boiling the leaves and stems of the tree.

What I claim and desire to secure, is:

1. A medicinal compound of the kind set forth, comprising a mixture of two grains of pilocarpin hydrochlorid, two ounces of distilled water, and five drops of juice of *uva ursi*.

2. A composition for the treatment of diseases of the eyes comprising as a major portion a solution of pilocarpin hydrochlorid and as a minor portion the juice of *uva ursi*.

In testimony whereof I affix my signature.

LOUIS J. HRISSIKOS.